United States Patent [19]

Prestridge

[11] 4,126,537
[45] Nov. 21, 1978

[54] METHOD AND APPARATUS FOR SEPARATION OF FLUIDS WITH AN ELECTRIC FIELD

[75] Inventor: Floyd L. Prestridge, Tulsa, Okla.

[73] Assignee: Combustion Engineering, Inc., Stamford, Conn.

[21] Appl. No.: 816,115

[22] Filed: Jul. 15, 1977

[51] Int. Cl.² .................. B01D 13/02; B03C 5/00
[52] U.S. Cl. .................................. 204/302; 204/188
[58] Field of Search ............... 204/302–308, 204/186–191

[56] References Cited

U.S. PATENT DOCUMENTS

| | | | |
|---|---|---|---|
| 1,838,928 | 12/1931 | Fisher | 204/302 |
| 1,838,933 | 12/1931 | Fisher et al. | 204/302 |
| 1,838,979 | 12/1931 | Worthington | 204/302 |
| 2,092,491 | 9/1937 | Adams et al. | 204/302 |

Primary Examiner—T. M. Tufariello
Attorney, Agent, or Firm—Arthur L. Wade

[57] ABSTRACT

Fluids are separated by passing their mixture through an electric field which is varied in strength. As coalescense of a first fluid dispersed in the second fluid begins, the mixture is flowed in a path which carries the coalescing fluid through the field which progressively changes strength. Fluid shear forces are avoided between the coalescing fluid and the fluid in which the coalescing fluid is dispersed. The size of the coalescing fluid drops increase and separate from the remaining fluid mixture under the force of gravity.

5 Claims, 4 Drawing Figures

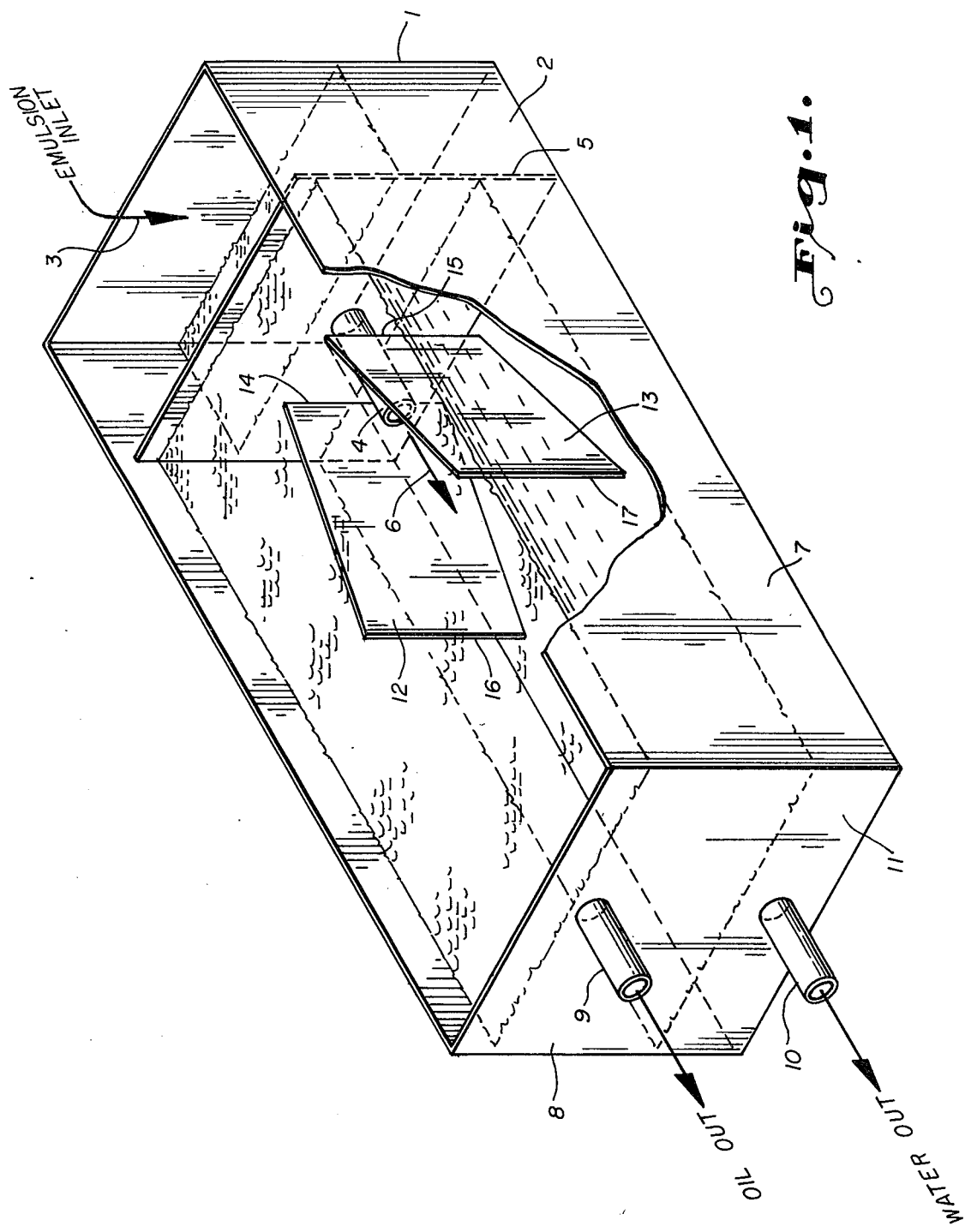

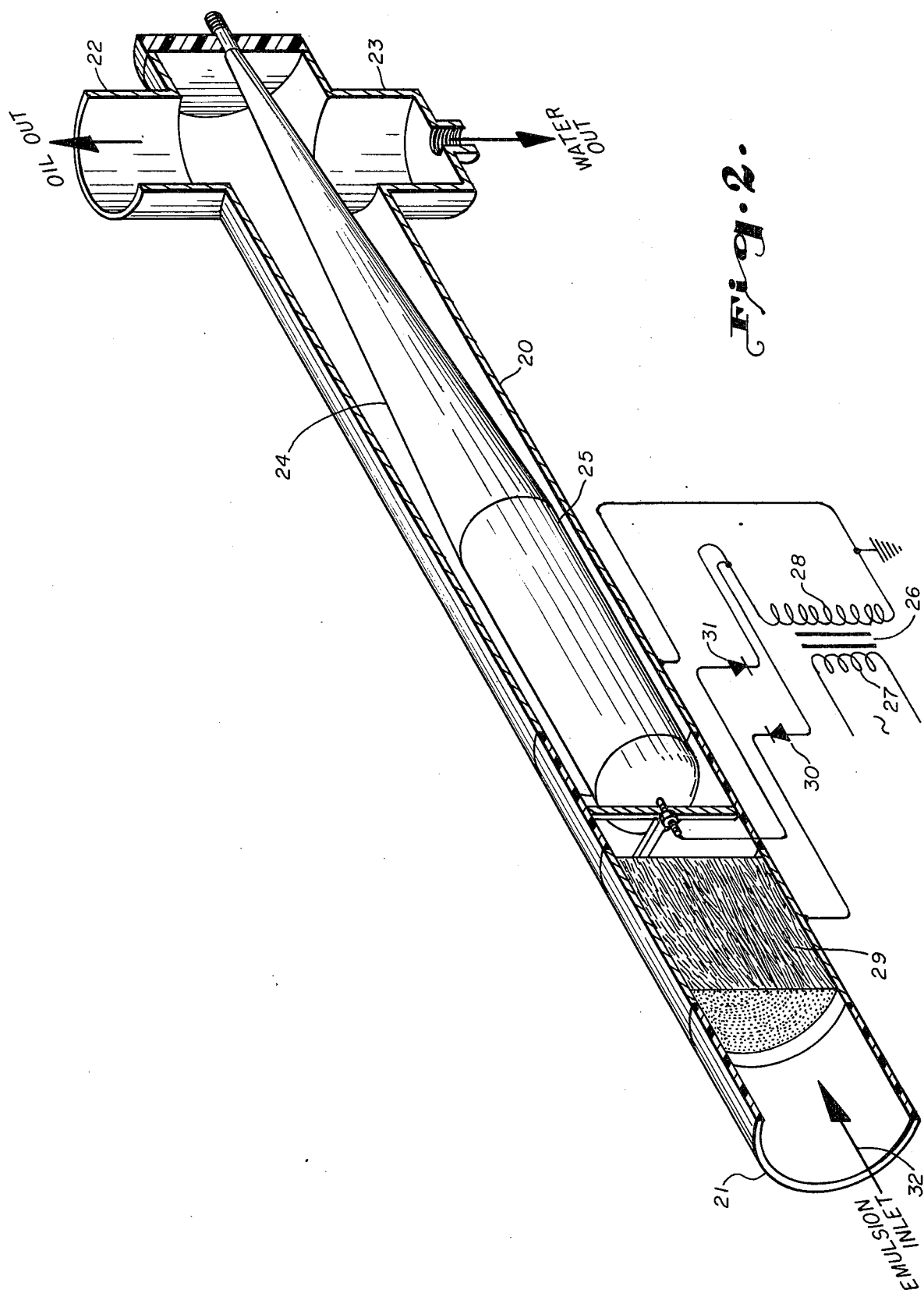

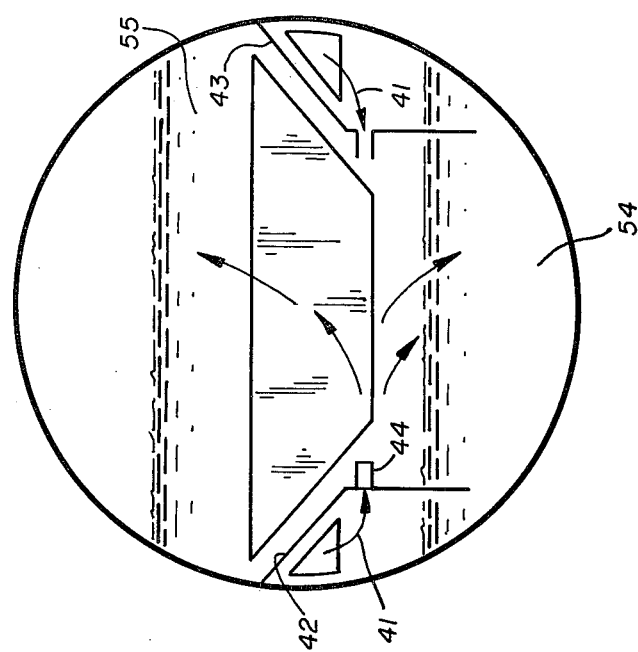
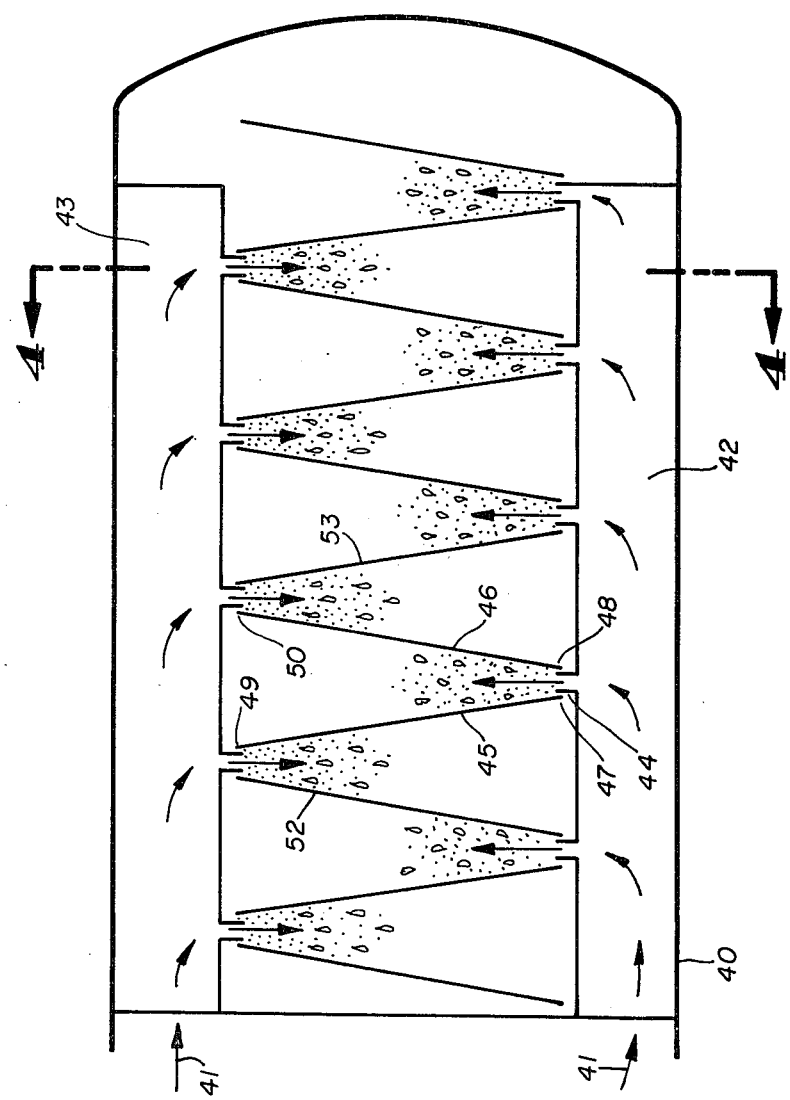

METHOD AND APPARATUS FOR SEPARATION OF FLUIDS WITH AN ELECTRIC FIELD

BACKGROUND OF THE INVENTION

In recent years the need for rapid, high volume liquid/liquid separation for the oil industry has increased. Most of the secondary and tertiary recovery methods developed in the United States and Canada utilize large quantities of water, resulting in mixtures of oil and water which are difficult to separate. Even the major oil producing countries in the Middle East are now beginning to produce ever increasing volumes of brine with their oil, increasing the demand for high volume desalting equipment.

New developments and processes in other industries are also requiring liquid/liquid separation equipment. A good example in the mining industry is the solvent extraction processes. The chemical industry is utilizing similar liquid ion exchange processes. All of these processes require elaborate liquid/liquid mixing and/or separating facilities.

The use of high voltage electric fields to force the separation of oil field emulsions is a well known and accepted practice. These fields greatly speed the coalescence and separation of immiscilbe liquids, over conventional heater treaters and settlers using mechanical aids to coalescense. However, considerable retention time is still necessary, and large vessels are required if large volumes of emulsions are to be processed in a short time.

"Retention Time" is that period required for a first fluid dispersed in a second fluid to settle into a single body from which it can be removed. Many things will affect retention time. A large factor is the size of the drops formed by the dispersed fluid. Considering gravity to be the usual external force applied to the dispersed drops, if the diameter of these drops are doubled, their falling velocity through the fluid in which the drops are dispersed will be increased ten times under Stokes Law. An electric field is a tool which has been used to increase the size of the dispersed drops by forcing separated drops to join each other, or coalesce. The increase in the falling velocity of the coalesced drops will enable the size of the retaining vessel required for retention time to be greatly reduced.

One of the problems in using the electric field is centered in its strength. When the field begins to coalesce the dispersed drops its force upon there enlarging drops greatly increases. With the field strength constant, the enlarged drops travel in the second fluid fast enough to develop shear forces with the liquid in which they are dispersed to separate, or fragment, the enlarged drops. The conclusion is that the drops then broken up by the very force that caused them to coalesce. The electric field should be adjusted in strength as the fluid coalesces to larger size drops to prevent this cycle of coalescense ending in re-dispersion. It is the constant strength presently maintained for electric fields which limits the size of the drops of dispersed fluid.

Some values should be used to analyze the problem more completely. Drop size has been indicated as a large factor in liquid-liquid separation. Proximity of the drop to an electrode of the field is also considered. The larger the drop size, and the closer the drop to the electrode, the less electrical force is required to move the drop relative the electrode. Density and viscosity of the mixed fluids will affect mobility of the drops dispersed. However, as an example, if water drops in the order of 2-5 mirons in size were moved by an electric field strong enough to coalesce the drops, that same force would set up a limiting liquid shear force which would keep the size of the drops to the order of 6-10 microns. Water drops of this size will not settle from a light oil and separate in a practical period of retention time.

The strength of the electric field for the water-light oil mixture must be in the order of 30-40 thousand volts per inch. From this value, the field will have to be reduced after coalescense begins in order to prevent the shear forces from breaking up and redispersing them.

SUMMARY OF THE INVENTION

The present invention regulates the force of an electric field on drops of a first fluid dispersed in a second fluid in accordance with the increasing size of the drops coalesced by the field to prevent the development of liquid shear force on the dispersed fluid drops which will limit their growth. More specifically, a relatively high intensity electric field may be reuired to initiate coalescense of dispersed drops of fluid because of the small size of the drops. More specifically, the strength of the field applied to the dispersed drops is decreased as the coalescense progresses.

Structurally, the invention is embodied in establishing a flow path for the fluid mixture, one fluid dispersed as small drops in a second fluid, and generating an electric field with a decreasing voltage gradient in the direction of the flow of the mixture along the path. The distance between the electrodes between which the field is generated is increased to reduce the voltage gradient of the field.

Other features of the invention, and their advantages, will be apparent from the disclosure of the drawings, description and claims which follow.

BRIEF DESCRIPTION OF THE DRAWINGS

FIG. 1 is a perspective view of a vessel in which is mounted electrodes with which an electric field is generated to carry out the process in which the present invention is embodied;

FIG. 2 is a perspective view of a conduit functioning as a flow path for a mixture of fluids and in which an electrod system is mounted in the form of a cone to generate the electric field of the invention;

FIG. 3 is a somewhat diagrammatic sectioned plan view of electrodes mounted in the coalescing compartment of a vessel adapted to process oil well production as fluids to be separated by this embodiment of the invention; and FIG. 4 is a sectioned elevation of FIG. 3 along lines 4—4.

DESCRIPTION OF THE PREFERRED EMBODIMENT

The invention has been disclosed, to this point, as related to the separation of fluids. "Fluid" is a term which is to be applied to material in both a gaseous as well as liquid state. The invention is not to be limited to its application to gaseous fluids or liquid fluids. However, the fluids with which the invention was conceived, and reduced to practice, were those of oil and water as produced from oil wells and the fluids of liquid ion exchange systems in the mining industry. Therefore, without limiting the invention, the drawing disclosure is that of oil well production processed to separation.

In general, there are at least two ways to progressively degrade, or reduce the voltage gradient between fixed electrodes. First, the applied voltage to the electrodes can be electrically reduced with time and the drops of dispersed liquid increase in size. Second, the fixed electrodes can be placed in a configuration relative to a flow path for the mixture to create a strong field at one point in the path and progressive reduction of the field strength for a desired distance along the flow path. The configuration of electrodes is such that at the first point in the flow path the electrodes are close together. The distance between the electrodes is then gradually widened. There can be many variations of either way. Varying the applied voltage with time might be the more simple way to treat static or non-flowing systems. The divergent distance between electrodes might be more suited for dynamic, or flowing, systems.

FIG. 1 is a perspective view of a simple vessel 1 receiving oil well production into compartment 2. An entry arrow 3 indicates the oil-water mixture flowed into compartment 2 and held there preparatory to be directed into a specific flow path down the length of the vessel.

A horizontal conduit 4 connects through partition 5. It is through this conduit 4 the mixture of oil and water is directed down a flow path in which the coalescing force of an electric field initiates separation.

The direction of the flow path for the fluid mixture, or emulsion, is indicated by the flow arrow 6. The length of this flow path established is that required for the electric field to coalesce the water into drops large enough to gravitate into water body 7, interfacing with the upper oil body 8. Conduits 9 and 10 are mounted through end wall 11 for separation withdrawal of oil and water from their bodies 7 and 8.

The electric field generated along flow path 6 is established by applying a voltage to electrodes 12 and 13. This raw, simplistic representation of the structure with which the invention is practiced discloses clearly one way of generating the field so that it is at its greatest intensity at the upstream end of flow path 6 and progressively decreases in strength in the downstream direction. The electrodes in the form of plates and are simply placed relatively close together at their upstream ends 14 and 15 and relatively far apart at their downstream ends 16 and 17.

The plates 16 and 17 diverge at the angle which regulate the rate at which the electric field will decrease in strength along path 6. The circuit with which to energize the electrodes and generate the field is not shown. The simple teaching is of how properly energized plate electrodes may be positioned in a vessel. Relative to a flow path, to establish an electric field which will have a finite strength at a point upstream of the fluid mixture in the path and decrease in strength along a downstream distance from the upstream point to coalesce the dispersed water drops into the predetermined size which will enable gravity to effectively separate them from the oil as the fluid flow along and discharge from end of the path.

FIG. 2 overlaps in disclosure with that of FIG. 1. In FIG. 2 the vessel is in the form of conduit 20. The fluid, or liquid, mixture is disclosed as an oil-water emulsion flowing into upstream end 21 of the conduit. After the process of separation, the less dense, or lighter, oil flows upward and out of conduit 20 through exit conduit 22. The more dense, or heavier water flows downward and out of conduit 23.

There are, of course, many controls, level detectors and other details which are necessary to the complete operation and could be disclosed in association with the vessel-conduit 20 and the mixture processed within the structure. However, these units were deliberately not disclosed to more effectively focus upon the teachings of the disclosure of this embodiment of the invention.

The benchmarks of comparison with the disclosure of FIG. 1 are in the flow path between the wall of conduit 20 and the cone-shaped wall 24 of electrode 25. The inside wall of conduit 20 forms a first electrode, and the cone-shaped wall 24 forms a second electrode which diverges from the first electrode. Thus both FIGS. 1 and 2 disclose divergent electrodes surfaces to reduce the strength of the electric field generated along the fluid path between the electrodes. The function of both embodiments of the invention adhere to the principles of regulating the strength of their electric fields so the liquid shear forces on the coalescing drops of dispersed fluid will not be developed great enough to cause re-fragmentation of the drops and dispersion of the fragments.

In FIG. 2 part of the electric circuit connected to the electrodes is disclosed, as including transformer 26 with a primary 27 connected to a source not shown and a secondary 28 connected on one side to ground and on the second side to electrode 25 and mesh electrode 29 in parallel.

Rectifier 30 is included in the connection of the secondary to apply the positive charge to mesh electrode 29. The negative charge, of course, is applied through rectifier 31 to electrode 25. The portion of the conduit 20 opposite electrode 25 is connected to ground. This circuit is the same as that disclosed in prestridge U.S. Pat. No., 3,772,180, issued Nov. 13, 1973.

With water drops dispersed in the mixture of fluids in flow path 32, the water drops will be given a positive charge as they pass through mesh electrode 29. The electrode 25 will have an equal negative charge. The large voltage gradient will initiate coalescense. As the size of the coalescing water drops grow, the mixture passes along the tapering cone portion of electrode 25 which is designated 24 in the drawings. The voltage gradiant of the electric field decreases as the distance between the electrodes increases, and the size of the drops continue to increase until they are pulled to the bottom of conduit 20 by gravity. The water then flows out the lower conduit 23 and the oil in which the water had been dispersed flows out the upper conduit 22.

A pause is made here to review the benchmarks established by the disclosure. First, an electric field is very effective in forcing dispersed drops of liquid to coalesce if the dispersed drops will accept the charge or is poler in nature. Water drops dispersed in oil is a primary example of a first liquid, dispersed in a second liquid, which will accept this charge and move relative to an electrode, contacting, and combining with, other drops in the field.

Second, it is the statement of the disclosure that once coalescing drops of liquid reach a predetermined size, the force of the electric field on the drops will be so great, and move the drops so quickly, that the liquid shear force on the drops will be reached by contact with the liquid in which the drops are dispersed. The drops of coalescing liquid will then fragment, divide, coalesce again and fragment again. This cycle will repeat at some size of the coalescing drop which will be the maximum limit of the size of the drops. If this drop size is smaller than that required for external forces to separate the dispersed liquid drops, satisfactory separation will not be obtained. The solution is to decrease the strength of the field on the coalescing drops. Physically, diverging the electrodes is a feasible way to progressively decrease the field strength. Although FIG. 1 shows the electrodes can be flat plates diverging from each other, FIG. 2 discloses the divergence can be carried out by forming the electrodes as a cone and tube. In both cases, the voltages gradiant of the field decreases as the mixture of liquids flows between the electrodes. The coalescing drops of liquid progressively coalesce without liquid shear forces reaching the magnitude where the coalescing drops will be fragmented and redispersed.

FIGS. 3 and 4 disclose how the invention may be embodied in the coalescing, or treating, compartment of an emulsion treater. FIG. 3 is a plan view with which the outer shell 40 of a treater compartment is disclosed. FIG. 4 is a section along lines 4—4 of FIG. 3 which further reveals the compartment shell 40 as being cylindrical.

However the liquid mixture is prepared, from a temperature standpoint, the mixture is flowed into shell 40 as indicated by flow arrow 41. How the flow is divided, is not of present concern. Hopefully it is divided equally, and each half is flowed beneath a hood 42 and a hood 43 down along the sides of shell 40.

Each side hood has a series of openings which direct part of the fluid mixture from beneath the hood to between a pair of electrodes. In example, hood 42 has openings 44 through each of which a portion of the oil-water mixture is flowed between a pair of diverging plate electrodes. Each of the pair of electrodes functions as a diverging electrode in each of a pair of electrodes.

Being very specific, electrode 45 is paired with electrode 46. These flap plate electrodes are brought close together at their ends, 47, 48 and diverge at their opposite ends 49, 50. The liquid mixture injected between ends 47, 48 flows toward diverging ends 49, 50, the coalescing drops becoming large enough to gravity to body 54.

Each of electrodes 45, 46 are, in turn, paired with other electrodes. Electrode 45 is paired with electrode 52. Electrode 46 is paired with electrode 53. Two diverging electrodes are thus formed on each side of diverging electrodes 45,46. Between each pair of diverging electrodes is flowed a part of the oil-water mixture to be separated under the concepts of the invention.

FIG. 4 discloses how the water drops fall from between the sets of electrodes to form water body 54. The oil of course, stripped of water it entrained, forms a body 55 above the plate electrodes. The usual conduits are provided through which to draw off both oil and water from the bodies 54 and 55.

Structuring definitions of the various facets of the inventive concepts in the disclosure is difficult to couch in robust language within this particular art. As novel as the conepts are, they are embodied in structure and process which have had to be described with words such as vessel, flow, fluids, coalescense, electrodes, and electric field. This is hardly a dramatic arsenal from which to select telling combinations that will ring with the solid advances this invention makes in the art. Therefore, if I have not had words available with a persuasive bite to them, I have at least made sure I have not been misunderstood as I traced the periphery of the scope of the present invention.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. An electric processor for mixtures of multiple fluids, including,
   a metallic vessel formed as a fluid conduit,
   a source of a mixture of multiple fluids connected to an inlet of the vessel to supply the mixture so it will flow through the vessel,
   a first electrode mounted in the vessel at a position to initially contact the fluid mixture,
   a second electrode mounted in the vessel downstream of the first electrode to provide an annulus with the internal walls of the vessel and providing a conical form with walls which increase in distance from the internal walls of the vessel in the downstream direction of flow of the fluid mixture,
   a source of electrical potential,
   means connecting the electrical potential source to the first and second electrodes in parallel to provide a positive charge upon the first electrode and a negative charge upon the second electrode to establish a potential between the two electrodes which is greater than the potential between either electrode and ground, to provide a positive charge for one of the fluids of the mixture as the mixture flows in contact with the first electrode and a negative charge for the conical electrode to provide a high initial gradient field for the mixture which decreases along the length of the conical electrode in the direction of flow through the vessel,
   and separate outlet conduits connected to the downstream end of the vessel through which fluids separated by the field are conducted separately from the vessel.

2. The processor of claim 1 in which,
   the source of electrical potential is a transformer having a source of voltage connected to its primary,
   the means connecting the source to the first and second electrodes includes the secondary of the transformer connected from one side to ground and connected from the other side to the electrodes in parallel,
   and a rectifer included in each parallel connection to provide a positive charge for one of the fluids of the mixture and a negative charge for the conical electrode to provide the high gradient.

3. The processor of claim 2, in which, the first electrode is in the form of a metallic mesh through which the mixture flows.

4. An electric processor for mixtures of a fluid more polar than the fluid in which it is dispersed in the form of small droplets, including, a shell horizontally extended, an inlet connected to the shell to flow into the shell the fluid mixture, a distribution structure with which the mixture is flowed along each side of a horizontal plane at the lower portion of the shell, a pair of electrodes extending transverse the horizontal axis of the shell, each electrode of the pair diverging from each other from one side of the horizontal through the vessel to form a path for a portion of the fluid mixture flowed along a side of the horizontal plane, a first chamber below the electrodes for collecting the heavier of the fluids separated from the mixture by the electrostatic field of the electrodes, a second chamber above the electrodes for collecting the lighter of the separated fluids, a source of electrical energy connected to the electrodes to establish an electrostatic field, an outlet conduit connected to the collecting chambers for separate discharge of the separted fluids, 5. The processor of claim 4, in which, a second pair of electrodes extend transverse the horizontal axis of the shell, formed with a common electrode between to diverge from each other from opposite directions.

* * * * *